(12) United States Patent
Zeuch et al.

(10) Patent No.: US 12,597,862 B2
(45) Date of Patent: Apr. 7, 2026

(54) ENERGY SUPPLY DEVICE WITH SAFETY-RELATED SHUT-DOWN FACILITY AND METHOD OF SWITCHING OFF THE DEVICE

(71) Applicant: Phoenix Contact GmbH & Co. KG, Blomberg (DE)

(72) Inventors: Jochen Zeuch, Blomberg (DE); Hartmut Henkel, Blomberg (DE); Patrick Schweer, Hameln (DE)

(73) Assignee: PHOENIX CONTACT GMBH & CO. KG, Blomberg (DE)

( * ) Notice: Subject to any disclaimer, the term of this patent is extended or adjusted under 35 U.S.C. 154(b) by 705 days.

(21) Appl. No.: 17/919,750

(22) PCT Filed: Apr. 21, 2021

(86) PCT No.: PCT/EP2021/060423
§ 371 (c)(1),
(2) Date: May 19, 2023

(87) PCT Pub. No.: WO2021/214160
PCT Pub. Date: Oct. 28, 2021

(65) Prior Publication Data
US 2023/0275514 A1 Aug. 31, 2023

(30) Foreign Application Priority Data

Apr. 22, 2020 (BE) .................................. 2020/5269

(51) Int. Cl.
*H02M 3/335* (2006.01)
*H02M 1/08* (2006.01)
(52) U.S. Cl.
CPC ............. *H02M 3/335* (2013.01); *H02M 1/08* (2013.01)

(58) Field of Classification Search
CPC ...... H02M 3/335; H02M 1/08; H02M 1/0006; H02M 3/33523
See application file for complete search history.

(56) References Cited

U.S. PATENT DOCUMENTS

| | | | | |
|---|---|---|---|---|
| 11,325,808 | B2 * | 5/2022 | Nakari | ................... B66B 5/0031 |
| 2018/0073765 | A1 * | 3/2018 | Doi | ........................... F24F 11/32 |

FOREIGN PATENT DOCUMENTS

| | | |
|---|---|---|
| DE | 3112377 C2 | 1/1983 |
| DE | 4115295 A1 | 11/1992 |

(Continued)

OTHER PUBLICATIONS

Liang Yunfeng, "Intelligent Automotive Isolated Gate Driver with Adaptive Fault Management and Built-in Switched Mode Power Supply", 2020 IEEE Applied Power Electronics Conference and Exposition (APEC), IEEE, Mar. 15, 2020, pp. 2643-2646, XP033785018, DOI: 10.1109/APEC39645.2020.9124504.

(Continued)

*Primary Examiner* — Kyle J Moody
(74) *Attorney, Agent, or Firm* — LEYDIG, VOIT & MAYER, LTD.

(57) ABSTRACT

An energy supply device includes: a transformer with a first winding; a power switching device; a feedback device; and a voltage supply device for providing supply voltage for the feedback device. The power switching device is coupled to the first winding and connects through periodically by a control signal generated by the feedback device. The feedback device includes a first switching element for interrupting the control signal when a shut-down signal occurs.

14 Claims, 4 Drawing Sheets

(56) References Cited

FOREIGN PATENT DOCUMENTS

EP          3457555 A1     3/2019
KR      100653858 B1    12/2006

OTHER PUBLICATIONS

Texas Instruments, "IGBT Gate Driver Reference Design for Parallel IGBTs With Short-Circuit Protection and External BJT Buffer", TI Designs IGBT Gate Driver Reference Design for Parallel IGBTs With Short-Circuit Protection and External BJT Buffer, Jan. 1, 2016, Design Folder ISO5852S Product Folder ASK Ou, XP055397741, pp. 1-33, Texas Instruments, Dallas, Texas.
Texas Instruments, "ISO5451 High-CMTI 2.5-A / 5-A Isolated IGBT, MOSFET Gate Driver with Active Safety Features", Jun. 30, 2015, pp. 1-34, XP055564841, URL:http://www.farnell.com/datasheets/1960346, Texas Instruments, Dallas, Texas.
Jae-Eul Yeon et al, "A single stage flyback power supply unit for LED lighting applications", Electrical and Electronics Engineering, 2009. Eleco International Conference On, IEEE, Piscataway, NJ, USA, Nov. 5, 2009 (Nov. 5, 2009), p. 1-288, XP031581674, Isbn: 9781424451067.
Keller R A Ed—Institute of Electrical and Electronics Engineers, "Off-line power integrated circuit for international rated 60-watt power supplies", Proceedings of the Annual Applied Power Electronics Conference and Exhibition. (APEC). Boston, Feb. 23-27, 1992; [Proceedings of the Annual Applied Power Electronics Conference and Exhibition. (APEC)], New York, IEEE, US, Band CONF. 7, Feb. 23, 1992 (Feb. 23, 1992), p. 505-512, XP010056903 DOI: 10.1109/APEC.1992.228368 external link ISBN: 9780780304857.
Goodenough F, "Switch-Mode Ics Minimize Off-Line Power Supply Size", Electronic Design, Penton Media, Cleveland, OH, US, Band 45, Nr. 7, Apr. 1, 1997 (Apr. 1, 1997), XP000694685,ISSN:0013-4872.
Steve Roberts et al., "DC/DC Book of Knowledge", United States ISBN: 978047138802931. Dec. 2016 (Dec. 31, 2016), URL:http://www.recompower.com/fileadmin/EMEA/Downloads/Book_of_Knowledge/BookOfKnowledge_EN_WEB.pdf, XP055551069, ISBN: 9780471388029.
Electrical Engineering Stack Exchange "Simpler way to enable/disable voltage regulator using DC jack shunt as a switch?", Mar. 23, 2017 (Mar. 23, 2017), URL:https://electronics.stackexchange.com/questions/294208/simpler-way-to-enable-disable-voltage-regulator-using-dc-jack-shunt-as-a-switch XP002801560 [found on Dec. 16, 2020].

* cited by examiner

ENERGY SUPPLY DEVICE WITH SAFETY-RELATED SHUT-DOWN FACILITY AND METHOD OF SWITCHING OFF THE DEVICE

CROSS-REFERENCE TO PRIOR APPLICATIONS

This application is a U.S. National Phase application under 35 U.S.C. § 371 of International Application No. PCT/EP2021/060423, filed on Apr. 21, 2021, and claims benefit to Belgian Patent Application No. BE 2020/5269, filed on Apr. 22, 2020. The International Application was published in German on Oct. 28, 2021 as WO/2021/214160 under PCT Article 21(2).

FIELD

The present invention relates to an energy supply device for supplying a load with electrical energy, wherein the energy supply device has a safety-related shut-down facility. The energy supply devices of this type are, for example, switched-mode power supplies and uninterruptible power supplies (UPS). The invention also relates to a method of switching off an energy supply device.

BACKGROUND

To ensure the protection against personal injury, a safety-related shut-down facility is necessary for the operation of a machine. In the simplest case, such a facility interrupts the energy supply, e.g., of motors, or brakes them. Appropriate safety requirements are defined for the design of machines in the series of standards EN 13849. These requirements are then implemented in individual components, which are evaluated for functional safety according to IEC 61508/IEC61511 with a safety integrity level (SIL).

Electrical current loads in machines or systems are supplied either directly from the mains voltage or via a connected upstream energy supply device, e.g., power supply, which provides a lower, regulated output voltage. In order to switch off the power supply to a load in a safety-oriented manner, the power circuit breakers, in particular contactors or safety relays, which interrupt the power supply, are usually connected in series at the input and/or output of the power supply. In the simplest case, a safety-related shut-down facility, such as an emergency stop function, consists of two independent contactors or relays connected in series, whose contacts are opened without activation energy.

Likewise, circuit breakers are used in parallel to the inputs or outputs. Hereby, the power supply is short-circuited and any power surges are reduced. Also, a downstream motor is also braked by a short circuit in the energy supply activated on the output side. In this way, for example, an upstream fuse is triggered, and these circuits are referred to as "crowbar" circuits (crowbars).

If a regulated power supply is short-circuited on the output side, it usually limits the output current. Then, depending on the power supply characteristics, it either supplies the current permanently or switches off the output after a certain period of time. In the very simple power supply types, the current is limited by triggering a fuse.

The mode of operation of these circuit breakers is explained below with reference to the circuits shown in FIGS. 1 and 2. An energy supply device according to FIG. 1 has a symbolically represented single-phase switched-mode power supply 51 and input terminals 1, 2, which are coupled to the inputs of the switched-mode power supply, and has output terminals 10, 11 on the output side, which are coupled to the outputs of the switched-mode power supply 51. Hereby, on the input side, two power circuit breakers S1, S1n are connected in series between input terminal 1 and an input of the switched-mode power supply 51, and on the output side two circuit-breakers S10, S10n are connected between an output of the switched-mode power supply 51 and the output terminal 10. In addition, two power circuit breakers S2, S2n are connected in series on the input side, in parallel to the inputs of the switched-mode power supply 51. A back-up fuse F1 is arranged on the input side as a short-circuit fuse before the two circuit breakers S1, S1n.

FIG. 2 shows an energy supply device with a three-phase switched-mode power supply 52, which has input terminals 1-3 on the input side, coupled to an input of the switched-mode power supply, and output terminals 10, 11 on the output side, each coupled to an output of the switched-mode power supply. Hereby, on the input side, each of the input terminals 1-3 is connected to a corresponding input of the switched-mode power supply 52 via two circuit breakers S1, S1n connected in series. A back-up fuse F1, F2 or F3 is connected upstream to each of the three power circuit breakers S1. Furthermore, three power circuit breakers S2 are connected in parallel before the inputs of the switch-mode power supply 52. The wiring of the energy supply device on the output side corresponds to that of the circuit in FIG. 1.

When an emergency stop signal is applied, the series-connected circuit breakers S1, S1n interrupt the input supply for the energy supply device, and the output voltage of the energy supply device is disconnected from the load by the circuit breakers S10, S10n. Thereby, the circuit breakers are designed in a way to open when there is no voltage (normally open=no).

In order to prevent any interruption failure, e.g., due to welding of the contacts, in addition at least several independent circuit breakers are also connected in series for ensuring a classic emergency stop. In this case, the input power supply is short-circuited by the circuit breakers S2, S2n and the upstream fuse F1 is triggered. This corresponds to a crowbar circuit as it was implemented in older switched-mode power supplies, e.g. with a thyristor on the secondary side.

Accordingly, the secondary side of the switched-mode power supply 51 or 52 can be short-circuited with the circuit breakers S11 or S11n, respectively. In the case of power supplies with a DC voltage output, it should be noted that, when there is a short circuit on the output side, extremely high currents can flow through the output capacitors arranged in the switched-mode power supply 51 or 52.

However, the interconnection of circuit breakers of this type with an energy supply device for safety-oriented disconnection requires additional switching devices, complex wiring and extra costs.

DE 31 12 377 C2 discloses a flyback switched-mode power supply with an extended control range, which has a transformer and a power switching transistor, whereby a constant current source is switched on to the base circuit of the power switching transistor instead of a fixed current-limiting resistor. On the primary side, the switched-mode power supply is equipped with a gate turn-off thyristor for load-dependent control of the duty cycle.

DE 41 15295 A1 specifies a circuit arrangement for controlling and monitoring the load current flowing in a load circuit, which has an overload protection that not only influences the load current in the event of an overload, but also switches it off in the event of a short circuit. Furthermore, a short-circuit detector, which quickly switches off the load current in the event of a short-circuit, can also be used.

KR 100653858 B1 relates to a protective circuit for a switched-mode power supply, wherein the protective circuit triggers an emergency shut-down. The emergency shut-down monitors the supply voltages and causes the integrated control circuit of the switched-mode power supply to shut down if an error is detected.

SUMMARY

In an embodiment, the present invention provides an energy supply device, comprising: a transformer with a first winding; a power switching device; a feedback device; and a voltage supply device configured to provide supply voltage for the feedback device, wherein the power switching device is coupled to the first winding and configured to connect through periodically by a control signal generated by the feedback device, and wherein the feedback device comprises a first switching element configured to interrupt the control signal when a shut-down signal occurs.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
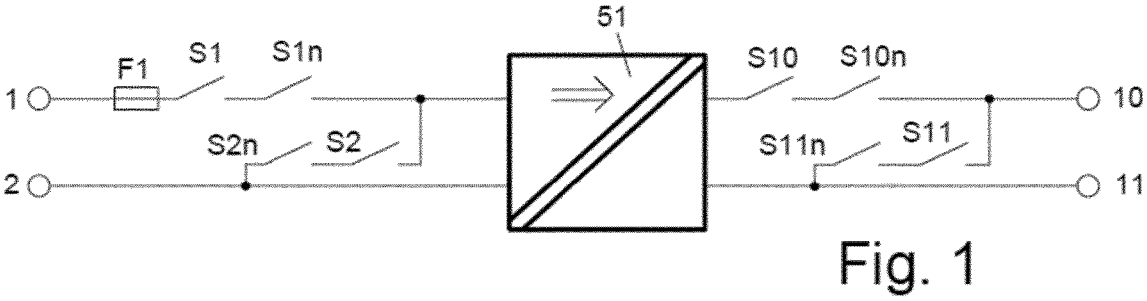
FIG. 1 shows a single-phase switched-mode power supply according to the prior art.
Figure 2:
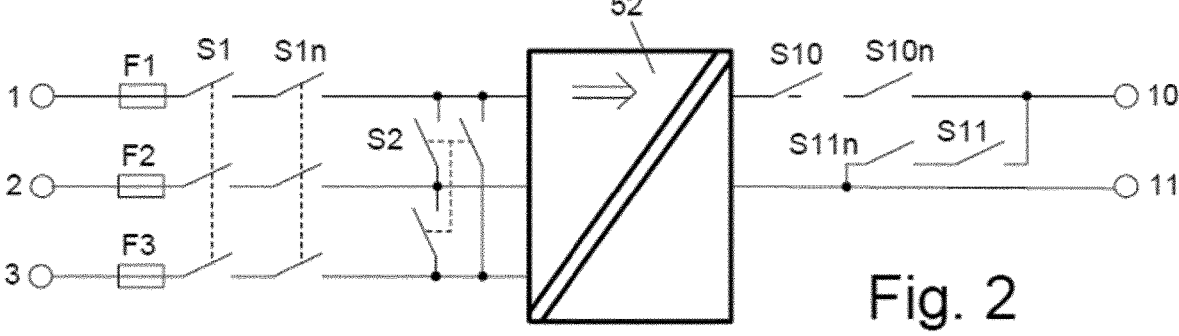
FIG. 2 shows a three-phase switched-mode power supply according to the prior art.

In an embodiment, the present invention provides an energy supply device for a load, which device achieves an improved emergency shut-down.

The energy supply device has a transformer with a first winding, a power switching device, a feedback device and a voltage supply device for providing supply voltage for the feedback device. The power switching device is coupled to the winding and can be switched through periodically by means of a control signal generated by the feedback device for supplying a load with energy. In this case, the feedback device has a first switching element that interrupts the control signal when a switch-off signal occurs. In one variant, the switch-off signal can correspond to the emergency stop signal. It is generated, for example, by a person pressing an emergency stop switch.

According to a preferred variant, the energy supply device has a transformer with primary winding, secondary winding and galvanic isolation, and the feedback device has a primary-side control circuit, where the switching element is arranged. In this case, the energy supply device is preferably implemented as a switched-mode power supply. Thereby, the switched-mode power supply can be configured both as flyback converter and forward converter.

According to another preferred variant, the feedback device contains a second switching element, which interrupts the supply voltage for the feedback device when the switch-off signal is applied. The voltage supply device is preferably coupled on the input side with a first connection to a source of input voltage of the energy supply device and on the output side with a second connection to a source of input current of the second switching element.

In a further preferred variant, the feedback device has an integrated circuit with enabling input and a third switching element, with the third switching element interrupting an enabling signal present at the enabling input when the switch-off signal occurs.

In a preferred embodiment example, the switching element or elements are implemented as bipolar transistors, whose control inputs are coupled to a reference potential during the operation of the energy supply device and wherein the bipolar transistors switch through when the reference potential is applied and thus they conduct a current. When the emergency stop switch is actuated, the reference potential is switched off and thus the switch-off signal is applied to the control inputs of the bipolar transistors, so that the current through the bipolar transistors is interrupted.

In an alternative, preferred embodiment example, the switching element or the switching elements are implemented as self-locking field-effect transistors, whose control inputs are supplied with an auxiliary voltage during the operation of the energy supply device, and thus they conduct a current. When the emergency stop switch is actuated, the auxiliary voltage is switched off, so that the field-effect transistors block automatically and thus interrupt the current.

In a further preferred embodiment example, the energy supply device has an emergency stop switch with a coupling element, preferably an optocoupler, and with a turning-off switch or, respectively, the emergency stop switch, which has one or more serially connected contacts that open when actuated. The switching contacts are connected in series with the input side of the coupling element. When the switch is closed and is not actuated, the input side of the coupling element is activated and thus the output side is closed. When the switch is actuated, a DC voltage on the input side of the coupling element is interrupted and a switch-off signal is generated; as a result, the output side of the coupling element, which is coupled to the feedback device, opens for transmitting the switch-off signal.

In a further advantageous embodiment example, the power switching device has a control input, and the first switching element is arranged spatially directly before the control input of the power switching device.

In a further advantageous embodiment example, the energy supply device has a temperature monitoring circuit for the energy supply device that generates an error signal when over-temperature is detected, which acts as a switch-off signal at the control input(s) of the switching element(s) for blocking the switching elements.

In a further advantageous embodiment example, the energy supply device has a second output voltage monitoring circuit for the energy supply device that generates an error signal when a power surge on the output side is detected, which is applied via feedback to the primary side as a switch-off signal at the control input or inputs of the switching element or elements in order to block the switching elements.

A method according to the invention for switching off the energy supply device, in which the energy supply device contains a power switching device, an emergency stop switch, a feedback device and a voltage supply device for providing a power supply voltage for the feedback device, and in which the power switching device is periodically switched through by means of a control signal generated by the feedback device, characterized in that when the emergency stop switch is actuated, one or more switching elements arranged in the feedback device are opened and the generation of the control signal is thereby prevented or blocked.

The present description illustrates the principles of the invention-related disclosure. It is thus understood that those skilled in the art will be able to design various implementations which, while not explicitly described herein, embody the principles of the invention disclosure and are intended to be protected within their scope.

Figure 3:
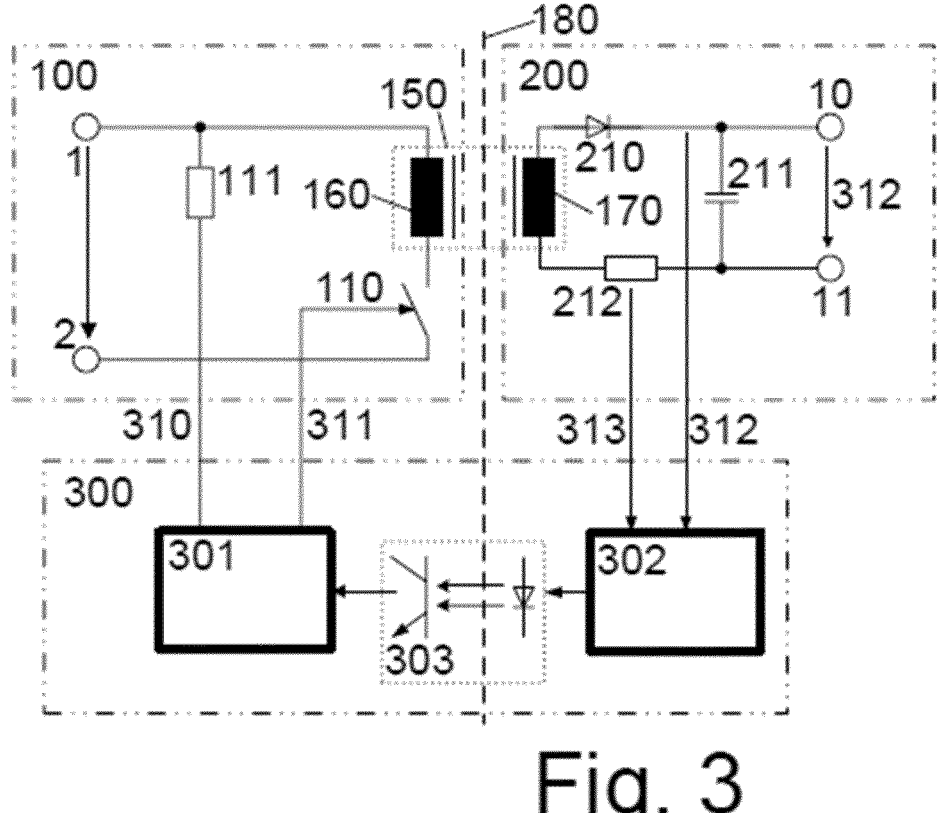
FIG. 3 shows an energy supply device with a control circuit, which has a primary-side activation of a circuit breaker.

An energy supply device according to the invention, in particular a switched-mode power supply, with a safety-oriented shut-down is shown in FIG. 3. The switched-mode power supply has a transformer 150 with a primary winding 160, a secondary winding 170 and a galvanic isolation 180. The galvanic isolation 180 defines a primary-side power path 100 that is connected to the network and a galvanically isolated secondary-side power path 200. The switched-mode power supply also has an input and an output, each of them containing two input terminals 1, 2 and two output terminals 10, 11, respectively. DC voltage is applied to the input terminals 1, 2. A power sink or, in particular, a load, e.g., a motor, can be connected to the output terminals 10, 11.

Between the primary winding 160 and one of the input terminals, in this embodiment example the input terminal 2, a power switching device 110 is connected in series with its current-carrying connections. The power switching device 110 has a control input at which a control signal 311 is present during the operation of the switched-mode power supply unit. The power switching device 110 is continuously opened and closed during the operation of the switched-mode power supply unit. As a result, alternating current flows through the primary winding 160, whereby the transformer 150 is magnetized and an alternating voltage is induced in the secondary winding 170, which is rectified by a rectifying element 210 and charges a smoothing capacitor 211, so that a smoothed direct voltage, output voltage 312, is present at the output terminals 10, 11. The power switching device 110 has, for example, one or more switching transistors. In particular, low-impedance field-effect transistors (MOS-FET, SiC-JFET, GaN-FET) or bipolar transistors such as, for example, bipolar transistors with an insulated gate electrode (IGBT), are used as switching transistors.

To regulate the output voltage, the switched-mode power supply has a feedback device 300 with a primary-side control circuit 301, a secondary-side control circuit 302 and a coupling element 303, for example an optocoupler. The primary-side control circuit 301 generates the control signal 311 for the power switching device 110.

The coupling element 303 connects the secondary-side control circuit 302 to the primary-side control circuit 301, so that the output voltage 312 of the switched-mode power supply is normally controlled via feedback by the feedback device 300 during the operation of the switched-mode power supply. For this purpose, the secondary-side control circuit 302 measures the output voltage 312 and an output current 313 of the switched-mode power supply by means of a current measuring device 212, for example by using a resistor, and compares them with the maximum values. If one of the maximum values is exceeded, the feedback device 300 signals this event as an error and transmits an error signal via the coupling element 30 to the primary-side controller 301. Subsequently, the primary-side controller 301 reduces the energy that is transmitted via the transformer 150, e.g., with pulse width modulation (PWM), by reducing the duty cycle until both the output voltage 312 and the output current fall again below the maximum values. The energy transfer is then increased again, e.g., by increasing the duty cycle, until one of the maximum output values is exceeded. This increase and decrease in the transmitted energy is continuously repeated during the operation of the switched-mode power supply, e.g. as a reaction to changes in the load. If the transformer 150 is not timed, then no energy is transmitted via the transformer 150 to the secondary side.

A rectified supply voltage 310 required for supplying energy to the primary-side control circuit 301 is generated by a voltage supply device 111, which is coupled on the input side to a first connection with the input voltage of the energy supply device. In the simplest case, the voltage supply device 111 is implemented by means of a resistor, which in this embodiment example is connected to the input terminal 1 and generates direct current voltage 310 that is reduced in comparison to the input voltage.

The switched-mode power supply can have different topologies and can be used, for example, as a flyback converter or forward converter with one-transistor or two-transistor circuit, or as a half bridge or full bridge. These can be hard-switching, e.g. with pulse width modulation (PWM) or resonant switching with pulse frequency modulation (PFM).

In the case of a flyback converter, the polarity of the secondary winding 170 and the rectifier element 210 is such that the transformer 150 is magnetized when the power switching device 110 is switched through and thereby acts as an energy store, and its energy is released via the secondary winding 170 to the secondary side when the power switching device 110 is blocked. In a forward converter, the polarity of the secondary winding 170 and the rectifier element 210 is such that when the power switching device 110 is switched through the energy is transferred to the secondary side.

Figure 4:
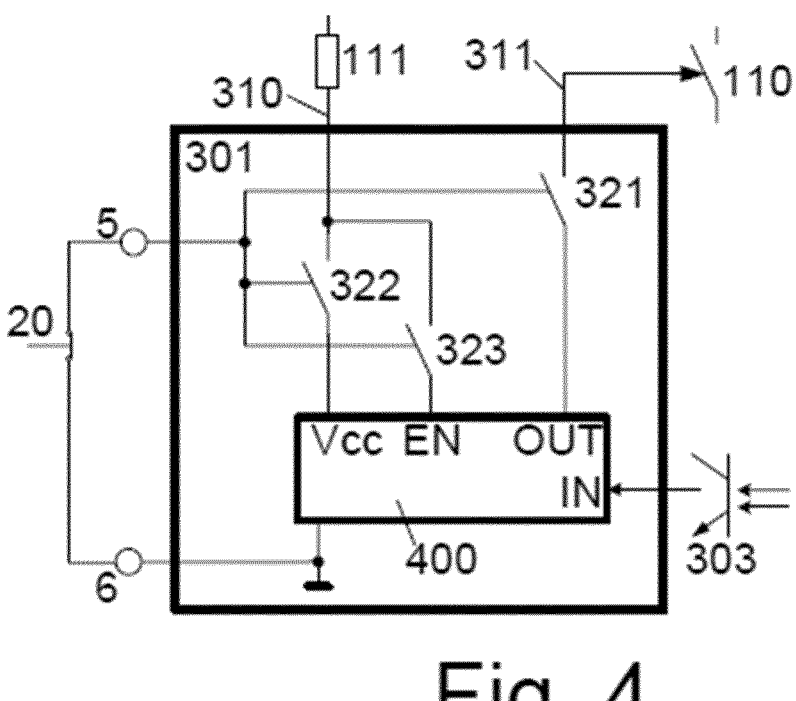
FIG. 4 shows a first preferred embodiment example of the control circuit of FIG. 3.

An embodiment example of the primary-side control circuit 301 is shown schematically in FIG. 4. The primary-side control circuit 301 contains an integrated circuit 400, which has an input Vcc for the primary-side supply voltage 310, an input IN for the feedback signal transmitted by the first coupling element 303, and an output OUT for the control signal 311. In addition, the primary-side control circuit 301 contains a first switching element 321, with which the control signal 311 can be interrupted, and a second switching element 322, with which the primary-side supply voltage 310 can be interrupted. The release of the integrated circuit 400 can be switched off with a third switching element 323. The switching elements are advantageously implemented by using transistors.

In this embodiment example, the switching elements 321, 322 and 323 are opened when there is no voltage at their control input. If the control inputs are connected to a reference potential, for example to ground, then the switching elements 321, 322, 323 close (or connect).

Furthermore, the control circuit 301 on the primary side has connection terminals 5, 6 for a switch-off signal, in particular an emergency stop signal, to which an emergency stop switch 20 is connected. If the emergency stop switch 20 is actuated and opened by a person, the switch-off signal is applied to the control inputs of the switching elements 321, 322 and 323. As a result, the connecting lines to the connection terminals 5, 6 are interrupted and the switching elements 321, 322, 323 open, so that the switched-mode power supply immediately stops operating without permitting another switching cycle. If the emergency stop signal is switched off at a later point in time by manually resetting the emergency stop switch 20, then the switching elements 321, 322, 323 close and the switched-mode power supply goes back into operation.

If the switched-mode power supply is in operation, the switching elements 321, 322 and 323 are closed and the integrated circuit 400 is supplied with the primary-side supply voltage 310 via the switching element 322 and generates the control signal 311 for the operation of the power switching device 110. If the emergency stop signal is now applied to the connection terminals 5, 6 via the emergency stop switch 20, for example when the emergency stop switch 20 is opened, the switching element 322 interrupts the primary-side supply voltage 310, the switching element 321 interrupts the control signal 311, and the switching element 323 interrupts an enabling signal present at an enable input EN of the integrated circuit 400, so that no more energy is transmitted to the secondary side by the switched-mode power supply. Thereby the switched-mode power supply is safely switched off, since at the same time the voltages 310, 311 required for the operation of the switched-mode power supply and the enable input EN are blocked.

Figure 5:
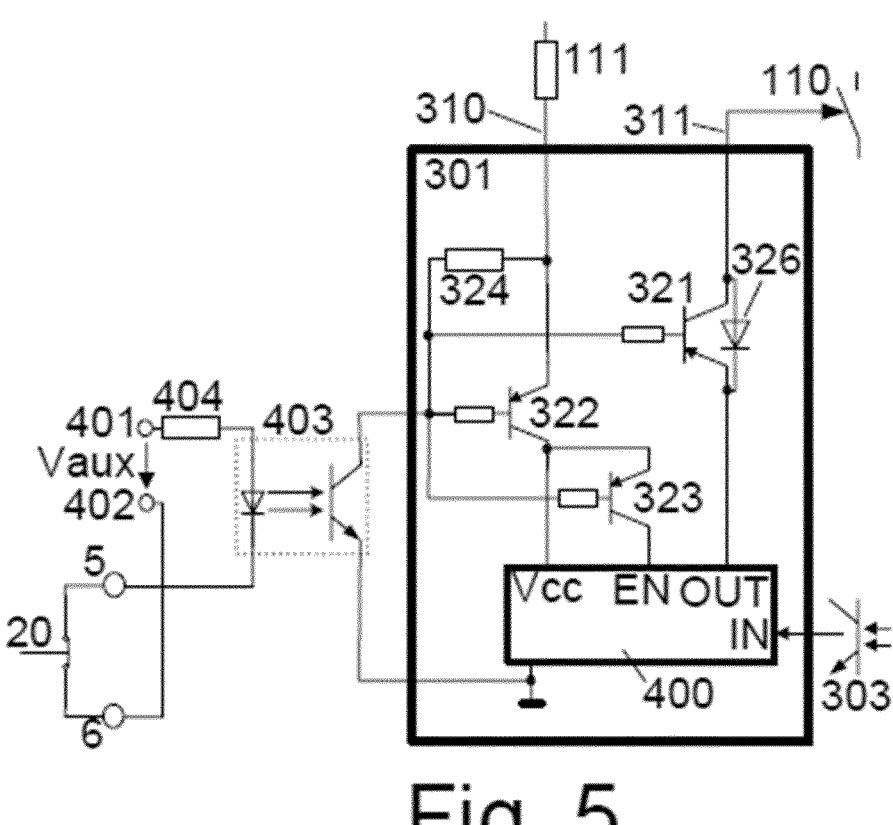
FIG. 5 shows a second preferred embodiment example of the control circuit of FIG. 3.

A preferred embodiment example of the primary-side control circuit 301 is shown schematically in FIG. 5. The switching elements 321-323 are implemented here by means of bipolar transistors 321-323, in particular PNP bipolar transistors, whose control inputs are connected via one or more resistors in such a way that the bipolar transistors 321-323 are conducting during the operation of the switched-mode power supply.

In this embodiment example, the emergency stop signal is applied to the primary-side control circuit 301 via a second coupling element 403, in particular an optocoupler, since the primary-side control circuit 301 is on the primary side and thus on the hot side of the switched-mode power supply. During the operation of the switched-mode power supply, a DC voltage Vaux exists at the connection terminals 401, 402 and is applied to the emergency stop switch 20 via an input diode of the second coupling element 403, so that when the emergency stop switch 20 is closed, a current flows through this diode and the output transistor of the second switching element 403 is thus switched through. In this case, the input diode is on a cold side of the coupling element 403 and the output transistor is on the hot side of the coupling element 403.

The output transistor of the second coupling element 403 is coupled to the control circuit 301, in particular to the control inputs of the bipolar transistors 321-323, in such a way that the control inputs of the bipolar transistors 321-323 are at a reference potential, in this embodiment example to ground, since the output transistor of the second coupling element 403 conducts in this case and thereby connects the control inputs of the bipolar transistors 321-323 to ground. In this embodiment example, the control inputs of the bipolar transistors 321-323 are also coupled to the supply voltage 310 via a resistor 324, which, however, has no influence on the function of the bipolar transistors 321-323 during the operation of the switched-mode power supply.

When the emergency stop switch 20 is actuated, the DC voltage Vaux at the input diode of the second coupling element 403 is interrupted, so that the output transistor of the coupling element 403 blocks. The supply voltage 310 is now present at the control inputs of the bipolar transistors 321-323 via the resistor 324, so that each of the bipolar transistors 321-323 blocks and the current flow through the bipolar transistors 321-323 is blocked immediately, as a result of which the switched-mode power supply for a reliable emergency shut-down subsequently stops operating.

Figure 6:
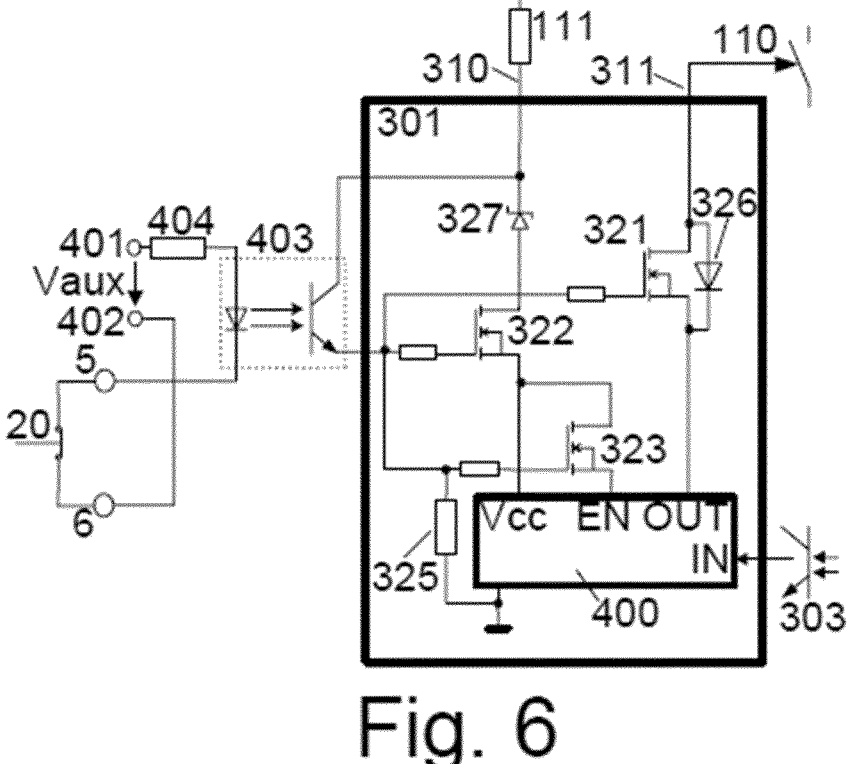
FIG. 6 shows a third preferred embodiment example of the control circuit of FIG. 3.

In a further preferred embodiment example shown in FIG. 6, the switching elements 321-323 are realized by the field-effect transistors 321-323. Here, as in the embodiment example in FIG. 5, the emergency stop signal is applied to the primary-side control circuit 301 via the second coupling element 403. The DC voltage Vaux is present at the connection terminals 401, 402. The emergency stop switch 20 is closed during the operation of the switched-mode power supply, so that the output transistor of the second coupling element 403 conducts. A Zener diode 327 generates positive auxiliary voltage from the supply voltage 310, which is connected through the output transistor of the second coupling element 403 to the control inputs of the field-effect transistors 321-323 during the operation of the switched-mode power supply, so that the field-effect transistors 321-323 conduct a current flow during the operation of the switched-mode power supply. In this embodiment example, the control inputs of the field-effect transistors 321-323 are also connected via a resistor 325 to a reference potential, in this embodiment example to ground, with the resistor 325 having no influence on the function of the field-effect transistors 321-323 during the operation of the switched-mode power supply.

When the emergency stop switch 20 is actuated, the DC voltage Vaux is blocked and as a result the output transistor of the second coupling element 403 blocks.

The control inputs of the field-effect transistors 321-323 are now at the reference potential due to the resistor 325, so that the field-effect transistors 321-323 block the flow of current and the switched-mode power supply subsequently stops its operation for a reliable emergency shut-down.

In further embodiment examples, NPN bipolar transistors or N-channel field-effect transistors can also be used for the switching elements 321-323 if the connections of the output transistor of the second coupling element 403 are swapped and are supplied with positive reference potential. The resistor 324 is then to be connected to ground.

Furthermore, a diode 326 can be connected in parallel to the power connections of the switching element 321, which is polarized in such a way that it blocks the control signal 311. This diode supports faster switching off of the power switching device 110 and prevents accidental switching on in the event of voltage jumps in the power switching device 110.

Therefore, the energy supply device according to the invention discloses a cost-effective implementation for a safety-oriented shut-down. This device is particularly applicable to switched-mode power supplies or uninterruptible power supplies (UPS). For example, a switched-mode power supply is expanded only by means of a few inexpensive components in order to switch off a load, e.g. a motor, in a safety-oriented manner when an emergency stop switch is actuated.

In the simplest case, for a safety-oriented shut-down, only the control of the power switching device or devices is interrupted. In order to achieve a preferred safety-oriented shut-down of the energy supply device, it is implemented in such a way that the clocking function of the power switching device within the feedback device is interrupted at a number of points independently of one another. When the energy supply device is activated, energy is only transmitted again when all the interruptions have been eliminated or bridged.

If the energy supply device is implemented as a switched-mode power supply, then the implementation, according to the invention, of an emergency shut-down facility is independent of the switched-mode power supply design. If the switched-mode power supply is supplied with AC voltage, a rectifier and a smoothing device are connected upstream of the actually converting converter in order to supply the switched-mode power supply with DC voltage. A switched-mode power supply has the advantage of working at a frequency that is clocked well above the mains frequency and, in particular, the transformer is much smaller and lighter than a 50 Hz transformer.

The first switching element is advantageously arranged spatially directly before the control input of the power switching device, so that the clocking of the switched-mode power supply is interrupted as efficiently as possible. This takes into account the fact that in the case of the enable-input EN of the integrated circuit 400, this input can be made inoperative, for example due to chip-internal errors or interruptions in the conductor tracks, and the power switching device continues to be clocked. In order to reliably prevent the clocking, the energy supply of the integrated circuit 400, in particular, is thus switched off.

The shut-down can also be linked to other error signals. For example, the energy transmission can be interrupted by a second output voltage monitoring circuit and feedback to the primary side in the event of power surge on the output side, or the switched-mode power supply can be protected from overheating and failure by a temperature monitoring circuit. In this way, the energy supply device is designed in such a way that the load can be supplied with energy only if all the components are functioning correctly.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS

Input terminals 1, 2, 3
Output terminals 10, 11
Backup fuses F1, F2, F3
Input-side circuit breakers S1, S1n, S2, S2n
Output-side circuit breakers S10, S10n, S11, S11n
Single-phase switched-mode power supply 51
Three-phase switched-mode power supply 52
Primary side power path 100
Power switching device 110
Power supply device 111
Transformer 150
Primary winding 160
Secondary winding 170
Galvanic isolation 180
Secondary power path 200
Rectifier element 210
Smoothing capacitor 211
Current measuring device 212
Feedback device 300
Primary control circuit 301
Secondary control circuit 302
First coupling element 303
Primary-side supply voltage 310
Control signal 311
Output voltage 312
Output current 313
Connection terminals for emergency stop signal 5, 6
Emergency stop switch 20
First switching element 321
Second switching element 322
Third switching element 323
Resistors 324, 325
Diode 326
Zener diode 327
Integrated circuit 400
Connection terminals for a DC voltage 401, 402
Second coupling element 403
DC voltage Vaux supply voltage input of the integrated circuit Vcc
Enable input of the integrated circuit EN
Output of the integrated circuit OUT
Control input of the integrated circuit IN

The invention claimed is:

1. An energy supply device, comprising:
a transformer with a first winding;
a power switching device;
a feedback device; and
a voltage supply device configured to provide supply voltage for the feedback device,
wherein the power switching device is coupled to the first winding and configured to connect through periodically by a control signal generated by the feedback device,
wherein the feedback device comprises a first switching element configured to interrupt the control signal when a shut-down signal occurs, and
wherein the feedback device comprises a second switching element configured to interrupt the supply voltage for the feedback device when the shut-down signal occurs.

2. The energy supply device of claim 1, wherein the voltage supply device is coupled on an input side to an input voltage of the energy supply device and on an output side to a current input of the second switching element.

3. The energy supply device of claim 1, wherein the transformer comprises a primary winding, a secondary winding, and a galvanic isolation, and wherein the feedback device comprises a primary-side control circuit where at least one of the first switching element and the second switching element is arranged.

4. The energy supply device of claim 3, wherein the energy supply device comprises a switched-mode power supply.

5. The energy supply device of claim 1, wherein the feedback device comprises a third switching element and an integrated circuit with an enable input, and wherein the third switching element is configured to interrupt a switching signal applied to the enable input when the shut-down signal occurs.

6. The energy supply device of claim 1, wherein the first switching element and the second switching element each comprise a bipolar transistor whose control inputs are coupled to a reference potential during operation of the energy supply device, and the bipolar transistors connect through when the reference potential is applied so as to enable a current flow, and wherein the bipolar transistors are configured to prevent a flow of current when the shut-down signal occurs at control inputs of the bipolar transistors.

7. The energy supply device of claim 1, wherein the first switching element and the second switching element each comprise a field-effect transistor whose control inputs are supplied with an auxiliary voltage during operation of the energy supply device so as to enable a current flow, and wherein each field-effect transistors is configured to prevent a flow of current when the shut-down signal at control inputs of the field-effect transistors occurs.

8. The energy supply device of claim 1, wherein the energy supply device has an emergency stop circuit with a coupling element and a switch which, when actuated, is configured to interrupt a DC voltage on an input side of the coupling element to generate the switch-off signal, and wherein an output side of the coupling element is coupled to the feedback device to transmit the switch-off shut-down signal.

9. The energy supply device of claim 8, wherein the coupling element comprises an optocoupler.

10. The energy supply device of claim 1, wherein the power switching device has a control input, and wherein the first switching element is spatially arranged directly before the control input of the power switching device.

11. The energy supply device of claim 1, wherein the energy supply device comprises a temperature monitoring circuit for the energy supply device configured to generate an error signal when over-temperature is detected, in which the error signal is sent as a further shut-down signal to the control inputs of the first switching element and the second switching element so as to block the switching element or elements.

12. The energy supply device of claim 1, wherein the energy supply device comprises an output voltage monitoring circuit for the energy supply device configured to generate an error signal upon detection of an output-side overvoltage, which is sent via feedback on the primary side as a further shut-down signal to the control inputs of the first switching element or elements and the second switching element so as to block the first switching element and the second switching element.

13. A method of switching off an energy supply device, comprising:

providing the energy supply device, which comprises a power switching device, an emergency stop switch, a feedback device and a voltage supply device configured to provide supply voltage for the feedback device; and periodically connecting through the power switching device by a control signal generated by the feedback device, wherein, when the emergency stop switch is actuated, one or more switching elements are opened and thereby a generation of the control signal is prevented or the control signal is blocked, wherein the control signal is blocked with one switching element of the one or more switching elements when a shut-down signal generated by the emergency stop switch occurs, and wherein the supply voltage for the feedback device is interrupted with another switching element of the one or more switching elements when a shut-down signal generated by the emergency stop switch occurs.

14. The method of claim 13, wherein the feedback device comprises an integrated circuit with an enable input, and with yet another switching element of the one or more switching elements, when a shut-down signal generated by the emergency stop switch occurs, an enabling signal adjacent to the enable input is interrupted.

* * * * *